United States Patent

[11] 3,597,922

[72] Inventor Gert Schrader
Schweinfurt, Germany
[21] Appl. No. 018,819
[22] Filed Mar. 12, 1970
[45] Patented Aug. 10, 1971
[73] Assignee Alfred Teves GmbH
Frankfurt am Main, Germany
Continuation-in-part of application Ser. No. 731,055, May 22, 1968, now Patent No. 3,509,722.

[54] MASTER CYLINDER
7 Claims, 5 Drawing Figs.
[52] U.S. Cl. .................................................. 60/54.6
[51] Int. Cl. .................................................. F15b 7/00
[50] Field of Search ........................................... 60/54.6

[56] References Cited
UNITED STATES PATENTS
2,197,125  4/1940  Cox .............................. 60/54.6
2,211,403  8/1940  Boldt et al. ................... 60/54.6

*Primary Examiner*—Edgar W. Geoghegan
*Assistant Examiner*—A. M. Zupeic
*Attorney*—Karl F. Ross

ABSTRACT: The piston of an automotive master brake cylinder is progressively rotated about its longitudinal axis. The intermittent rotation, occurring during each stroke, is designed to eliminate premature furrowing of the primary sealing cup of the piston at that part of its circumference which repeatedly passes over an unsmooth portion of the cylinder wall, e.g. a wall having one or more openings for the intake of brake fluid. Through the rotation the entire periphery of the primary cup is uniformly exposed to the unevenness in the wall.

Patented Aug. 10, 1971 3,597,922
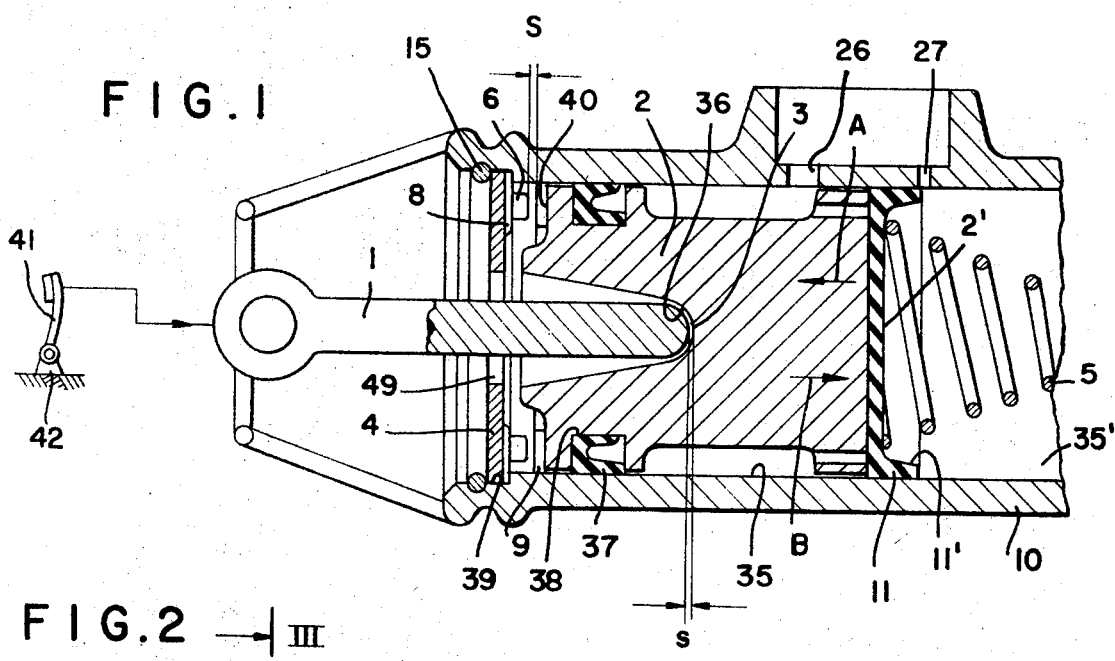
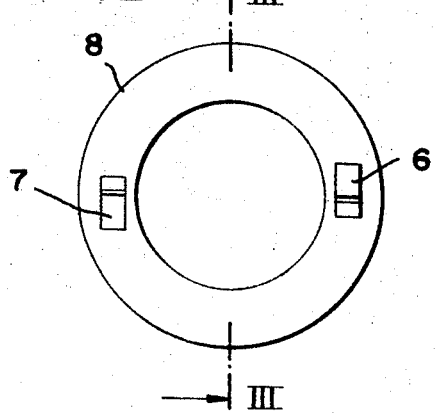
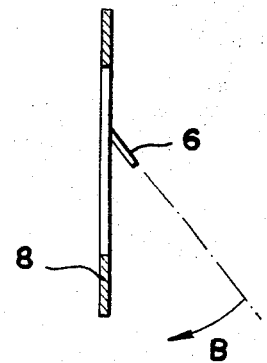
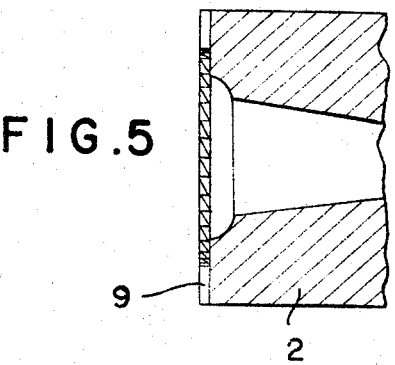
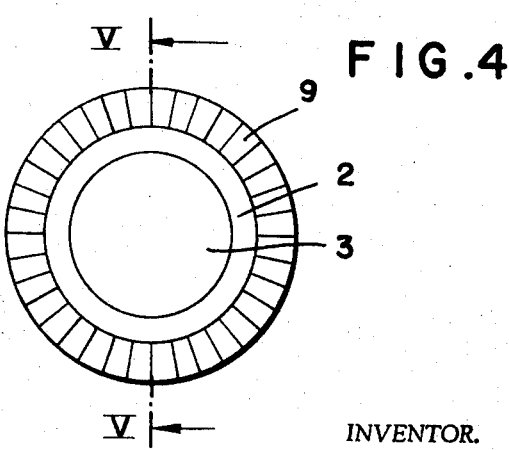
INVENTOR.
GERT SCHRADER
BY
Karl F. Ross
ATTORNEY

MASTER CYLINDER

This application is a continuation-in-part of application Ser. No. 731,055 filed May 22, 1968, now U.S. Pat. No. 3,509,722.

My present invention relates to a master-cylinder piston arrangement for an automotive brake system and, more particularly, to a piston reciprocatingly slidable in a cylinder having at least one radial bore under the influence of a force-transmitting member and a restoring force acting in opposite directions.

Conventionally, the master cylinder is formed with a drilled inlet port connecting the working chamber of the cylinder with the hydraulic fluid reservoir. The piston movable in the cylinder is provided at its free end with a forwardly concave seal, commonly referred to as the primary sealing cup, made from an elastomeric substance and designed to seal the piston in all-around contact with the cylinder interior. When, in the course of normal operation, the piston and its primary cup pass along the interior cylinder wall, a very limited area on the circumference of the primary sealing cup is apt to be furrowed by rubbing against unsmooth surfaces formed at the inlet opening in the wall. The deterioration of the elastomeric material in one spot may be severe enough to require frequent replacement of an otherwise still serviceable cup.

To avoid this one-sided wear it has been proposed earlier to rotate the cup relative to the piston on which it is mounted, so that the grooving is distributed evenly over the entire cup circumference. The drawback of this technique is that considerable force must be applied to turn the cup against the adhesive force holding it on the piston.

It is therefore the principal object of my invention to obviate the disadvantages of earlier systems and to provide reliable and economic means for the uniform wear of the primary cup attached to a piston axially slidable in a cylinder having at least one radial bore.

Another object is to provide simple means for equalizing wear of a primary sealing cup which can be incorporated into conventional brake systems.

These objects and others which will become apparent hereinafter are attained, in accordance with the present invention, by imparting on the forward or return strokes a torque to the piston itself, causing it to rotate together with the primary cup mounted thereon. Thus, in the course of a number of braking operations the piston can turn through a full circle, thereby distributing the wear symmetrically over the entire periphery of the cup surface. In the preferred embodiment the rotational force is generated by the linear or axial force which the piston receives through an actuating rod. A structurally simple mechanism generating the rotational force is located near the open end of the cylinder and can comprise two juxtaposed discs engageable with one another on the return stroke of the piston under the axial force of the restoring spring. One of the discs, received in a recess in the piston shoulder and provided with a sawtooth-edged rim, is engaged by tongues protruding along chords at an angle from the opposing disc when the two discs are proximate to one another. The relative attitude of the tongues and the serrations in which they are received creates a slight twisting motion which is applied to the piston and results in a stepwise 360° rotation about its longitudinal axis.

Thus the basic structure of the present invention comprises, in addition to the cylinder housing containing an axially extending cylinder bore with an uneven portion (e.g. an intake or outlet port formed radially in the wall of this bore), an axially reciprocable piston, one end of which forms a wall of the working chamber of the cylinder and is provided with an elastomeric, forwardly concave primary sealing cup nonrotatably attached to the piston and having a rim which is urged outwardly by the fluid pressure within the working chamber. A restoring spring in this working chamber bears against the piston (e.g. while being seated in the primary sealing cup) and exerts a restoring force tending to drive the piston in the rearward direction and to yieldably resist displacement of the piston in the forward direction. The actuating means of this assembly comprises an actuating rod which extends inwardly through the open end of the housing into the cylinder bore and may have a convex extremity which is swivelably received in the complementary socket at the other end of the piston, the rod being nonrotatable about the piston axis. According to an important feature of this invention, relative rotation is permitted between the convex end of the rod and the concave socket portion of the piston for restoring the motion-translating means to its initial condition after a partial angular displacement of the piston or to allow such angular displacement in the first place. Preferably, the relative rotation is permitted by maintaining a slight gap or "play" (as described above) between the forward end of the rod and the socket in which it is engaged or by providing other means for establishing rest positions of the piston (in its extreme or limiting rearward position) and the rod (in its unactuated position) to relax the frictional contact between the forward end of the rod and the rearward face of the socket.

The motion-translating means includes at least one member engageable with the rear portion of the piston upon axial displacement of the latter in one direction for angularly displacing the piston. Such means can include a pawl-and-ratchet arrangement formed, for example, by a tongue carried by one of the actuating rod or cylinder-housing members and engageable with a stepped portion of the piston forming the ratchet or, alternatively, a pawl on the piston member engageable with a ratchet on the cylinder member of the actuating-rod member. The tongue and teeth are formed on confronting axially facing surfaces lying in planes perpendicular to the axis of the cylinder.

The above and other objects, features and advantages of my invention will become more readily apparent from the following description, reference being made to the accompanying drawing in which:

FIG. 1 is an axial cross-sectional view of part of a master cylinder according to my invention;

FIG. 2 is a plan view of a perforated disc with attached tongues according to my invention;

FIG. 3 is a cross-sectional view taken along the line III–III OF FIG. 2;

FIG. 4 is a plan view of a toothed ratchet disc according to my invention;

FIG. 5 is a cross-sectional view of the part shown in FIG. 4 taken along the line V–V of FIG. 4.

In the drawing I show a master cylinder whose cylinder housing 10 has the usual master cylinder bore 35 connected with an intake port 26 and a bypass port 27 to a fluid reservoir (not shown) in which brake fluid is stored in the usual manner, as described and illustrated, for example, in "Principles of Automotive Vehicles," U.S. Government Printing Office, Washington, D.C., 1956, PP 437 ff. The outlet connection of the working chamber 35' of the cylinder is connected to the wheel brakes as there described.

Within the cylinder bore 35 the forward end 2' of an axially shiftable piston 2 is provided with a primary sealing cup 11 made of an elastomeric substance and facing the restoring spring 5 in the interior of the working chamber 35' of the cylinder bore 35. The spring is prestressed to resist displacement of the piston 2 in the forward direction (arrow B). The fluid pressure in chamber 35' urges the flange 11' of the primary cup 11 outwardly against the wall of the bore 35.

At its opposite end, the piston 2 is formed with a concave socket 3 in which the complementarily formed spherical head 36 of the actuating rod 1 is received.

A gland-type seal 37 in the peripheral groove 38 of the piston 2 slidably engages the wall of the cylinder 35 to prevent leakage of hydraulic fluid therefrom and constitutes the so-called secondary cup. An annular abutment disk 4 and an adjoining ring 8 are received in an inwardly open circumferential recess 39 formed in the wall of the cylinder housing 10 in the vicinity of its open end. The disks are held in position by the spring ring 15. The rod 1, which is not rotatable, passes through an axial opening 49 in the disk 4.

On the ring 8 opposite the piston shoulder 40, a pair of resilient metal tongues 6, 7 are disposed in diametrically opposed direction and parallel to one another, these tongues lying along respective chords of the disk and constituting pawls of a pawl-and-ratchet motion-translating means. The tongues extend at angles of approximately 45° to the plane of the disk. The annular shoulder 40 of the piston 2, extending laterally outwardly of the socket 3, is provided with radial serrations of substantially sawtooth-shaped form as seen in profile in FIG. 5, the teeth forming a ratchet.

In operation, depression of the brake pedal 41, which is fulcrumed at 42 to the vehicle body, shifts the force-transmitting rod 1 forwardly in the direction of the arrow B (FIG. 1) to displace the piston 2 to the right and compress the spring 5 while forcing brake fluid into the wheel brakes. Upon release of the brake pedal, the spring 5 expands and returns the piston 2 to the left, in the direction of the arrow A, and brings the serrated surface of the shoulders 40 to bear against the protruding free ends of the tongues 6, 7. The axial compression deflects the tongues inwardly, thereby generating an angular torque at the teeth engaged by the tongues. The piston is thus rotated. The progressive rotational motion of the piston, repeated upon each piston stroke upon the brake deactuation, distributes the wear produced by the uneven cylinder wall on the primary cup over its entire circumference. In the inactive position of the rod 1, the friction contact of its head with the socket is insufficient to impede rotation.

I claim:

1. A master-cylinder assembly for an automotive-brake installation, comprising:

a housing forming an axially extending master-cylinder;
   a master-cylinder piston axially shiftable in said cylinder and having sealing means in allaround engagement therewith;
   means including at least one nonrotatable rod member cooperating with said piston in axially displacing said piston in a forward direction to displace fluid from a working chamber of said cylinder and in a rearward direction for admitting fluid to said working chamber;
   cooperating motion-translating means effective upon displacement of said piston in one of said directions for stepping said piston angularly through a partial rotation of said piston, said sealing means including a primary sealing cup nonrotatable relatively to said piston and mounted thereon for sealing engagement with the wall of said cylinder and said means for displacing said piston including a restoring spring bearing upon said piston in said rearward direction, said motion-translating means including pawl-and-ratchet means on said housing and said piston remote from said working chamber for stepping said piston angularly upon displacement of said piston into an extreme rearward position by said spring, said rod permitting angular rotation of said piston in said extreme position and
   an annular disk mounted in said housing at an end of said cylinder remote from said working chamber and surrounding said rod member, said disk and said piston having confronting axially facing annular surfaces in planes perpendicular to the axis of the cylinder, said pawl-and-ratchet means including an annular array of teeth formed on one of said annular surfaces and a resiliently deflectable tongue formed on the other of said annular surfaces and engageable with said teeth in said extreme position of said piston while being deflectable to angularly advance said piston.

2. The assembly defined in claim 1 wherein said teeth are on said piston and said tongue is on said disk.

3. The assembly defined in claim 1 wherein said teeth are on said disk and said tongue is on said piston.

4. The assembly defined in claim 1 wherein said teeth are formed directly in an end wall of said piston remote from said primary cup.

5. The assembly defined in claim 4 wherein said tongue is integrally formed in said disk.

6. The assembly defined in claim 5 wherein said piston has a frustoconical recess receiving said rod.

7. The assembly defined in claim 6 wherein said recess terminates in a generally spheroidal socket, said rod having a complementary portion engageable in said socket.